(12) United States Patent
Kung et al.

(10) Patent No.: US 7,501,219 B2
(45) Date of Patent: Mar. 10, 2009

(54) THERMAL RECEIVER

(75) Inventors: Teh-Ming Kung, Rochester, NY (US); Jeffrey R. Gillmor, Brockport, NY (US); Brian T. Pope, Penfield, NY (US); Ronald S. King, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 118 days.

(21) Appl. No.: 11/316,856

(22) Filed: Dec. 23, 2005

(65) Prior Publication Data

US 2007/0149645 A1 Jun. 28, 2007

(51) Int. Cl.
*G03C 8/00* (2006.01)

(52) U.S. Cl. .................. 430/200; 430/213; 428/23; 428/32; 428/39

(58) Field of Classification Search .............. 525/177, 525/185, 216; 430/104, 200, 213, 941, 914; 428/32.23, 32.38, 32.39
See application file for complete search history.

(56) References Cited

U.S. PATENT DOCUMENTS

| | | | |
|---|---|---|---|
| 6,051,305 A | | 4/2000 | Hsu |
| 6,121,383 A * | | 9/2000 | Abdou-Sabet et al. ...... 525/192 |
| 6,893,592 B2 * | | 5/2005 | Arrington et al. ...... 264/177.19 |
| 6,936,350 B2 * | | 8/2005 | Murschall et al. ........... 428/480 |
| 7,122,239 B2 * | | 10/2006 | Bennett et al. .............. 428/141 |
| 7,265,183 B2 * | | 9/2007 | Jester ......................... 525/216 |
| 2003/0166781 A1 * | | 9/2003 | Berger et al. ................ 525/191 |
| 2003/0170476 A1 * | | 9/2003 | Murschall et al. ........... 428/483 |
| 2004/0167024 A1 * | | 8/2004 | Arrington et al. ........... 503/201 |
| 2004/0175570 A1 * | | 9/2004 | Kung et al. ................. 428/413 |
| 2006/0093846 A1 * | | 5/2006 | Chien et al. ................. 428/520 |

OTHER PUBLICATIONS

TICONA "Topas COC Toner Binder Resin—Innovation For Electrophotographic Printing" Celanese.

* cited by examiner

*Primary Examiner*—Thorl Chea
(74) *Attorney, Agent, or Firm*—Kathleen Neuner Manne

(57) ABSTRACT

A polymer composition including a cyclic-olefinic copolymer and another polymer, an image-receiving element including the polymeric composition in an image-receiving layer, a print assembly including the image-receiving element, and a method of printing are described.

5 Claims, 2 Drawing Sheets

THERMAL RECEIVER

FIELD OF THE INVENTION

A polymeric composition of a cyclic-olefinic copolymer and at least one other polymer, and image-receiving elements including the composition in the image-receiving layer, are described.

BACKGROUND OF THE INVENTION

Different methods of image formation are known, such as thermal printing, ink jet printing, electrography, and electrophotography. These printing methods, particularly thermal printing and ink jet printing, are gaining in popularity. To form such prints, an electronic picture can be subjected to color separation by color filters. The respective color-separated images can be converted into electrical signals. These signals can be operated on to produce signals corresponding to respective colors, such as cyan, magenta, and yellow. These signals can be transmitted to a printer. To obtain a print, each color can be printed successively on the receiver.

To reduce costs associated with forming image-receiving elements for use in printing systems such as thermal printing, ink jet printing, electrography, and electrophotography, polymeric image-image-receiving elements can be formed at least in part by extrusion. One or more layers, such as the image-receiving layer, a tie (adhesive) layer, or both, can be extruded onto the support. Methods and materials suitable for extruded thermal receivers are disclosed, for example, in U.S. Pat. Nos. 6,939,828, 6,897,183, and 6,893,592 to Arrington et al., U.S. Patent Publications Nos. US 2004/0167020 to Arrington et al., and US 2004/0166343, US 2004/0175570, and 2004/0167021 to Kung et al., and pending U.S. application Ser. No. 11/035,329, filed Jan. 13, 2005, to Kung et al.

Polymers favored for use in extrusion coating include polyesters, polycarbonates, and combinations thereof due to their stability. To increase the thermal stability, stabilizers such as phosphorus-containing compositions have been added to polymeric compositions. Known phosphorous-containing stabilizers include a phosphorous acid, an organic diphosphite such as bis(2-ethylhexyl)phosphite, a phosphate, an alkyl phosphate, an aryl phosphate, an inorganic phosphate, a phosphoric acid ester, or a phosphorous acid. The phosphorous-containing stabilizer can be combined with a plasticizer such as dioctyl sebacate before addition to the polymeric composition. However, even with stabilizers, the composition may only be stable for a few minutes, requiring extrusion to proceed at a rapid pace and/or use of small quantities of material. If not all material is extruded within a short period of time, for example, less than fifteen minutes, the composition can exhibit unacceptably high levels of cross-linking, resulting in a higher viscosity and uneven polymeric flow, causing voids or streaks in the cast sheet, or the composition can exhibit an unacceptable level of thermal degradation, resulting in streaks or a more liquid composition that does not properly set.

There is a need in the art for a means to reduce the amounts of additives in an image-receiving element, and maintain good print image formation, while still reducing or eliminating donor-receiver sticking. There is also a need to provide an image-receiving element capable of formation by extrusion coating to reduce costs. There is an additional need for stabilization, for example, at extrusion temperatures, in oxidative conditions, or both, to enable longer extrusion times and use of larger amounts of extrudate.

SUMMARY

A polymeric composition comprising a cyclic-olefinic copolymer and at least one other polymer, as well as an image-receiving element comprising the polymeric composition in an image-receiving layer, and methods of making the same are disclosed.

DETAILED DESCRIPTION

Figure 1:
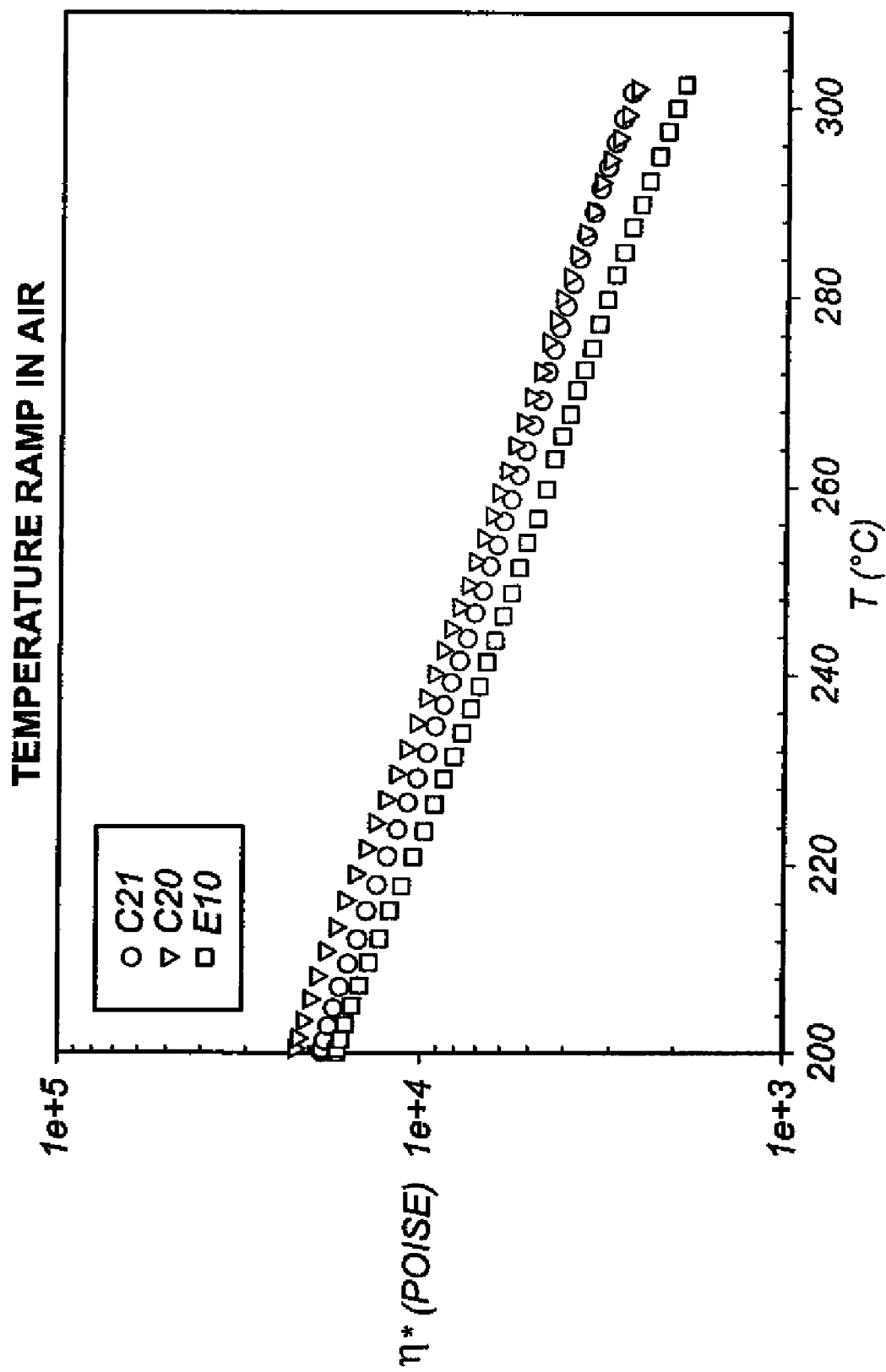
FIG. 1 depicts the viscosity of certain polymeric compositions during a temperature scan from 200° C. to 300° C.

According to various embodiments, an image-receiving element having an image-receiving layer including a polymeric composition of a cyclic-olefinic copolymer and at least one other polymer can reduce or eliminate the occurrence of chemical reactions, such as cross-linking, or thermal degradation when the polymer is exposed to high temperatures, such as 200° C., for an extended period of time.

Exposure of polymeric compositions, including blends and co-polymers, to high temperatures can result in either chemical reactions within or between the polymeric units, for example, cross-linking of polymeric chains, or thermal degradation, over time. As the temperature of a polymeric composition increases, the viscosity of the composition typically decreases monotonically. When the increasing temperature triggers a chemical reaction, such as cross-linking, the viscosity of the composition increases. When the increasing temperature triggers thermal degradation of the polymeric composition, the viscosity will suddenly decrease. Either an increase or decrease in viscosity can affect coating of the polymeric composition, resulting in defects such as streaks, voids, solids, or inability to properly set.

It has been found that a composition including a cyclic-olefinic copolymer with another polymer does not undergo chemical reactions or thermal degradation over an extended period of time. A composition including a cyclic-olefinic copolymer with another polymer does not require use of a stabilizer, and enables extrusion with larger batches, over longer periods of time, or both, without the occurrence of coating defects.

The cyclic-olefinic copolymer can be a copolymer of norbornene and ethylene. Suitable examples of commercially available cyclic-olefinic copolymers include those available from Ticona Ltd. (USA), such as Topas® COC 6013, 5013, and 8007, and Topas™. The cyclic-olefinic copolymer can be used in an amount sufficient to enable a stable composition, wherein a stable composition is one that does not experience a change in viscosity greater than 15% at a temperature of at least 270° C. for a period of at least 30 minutes, for example, at least an hour. The cyclic-olefinic copolymer can be used in an amount of between 0 and 50 wt. %, for example, from 5 wt. % to 40 wt. %, or from 5 wt. % to 20 wt. %.

The additional polymer can be, for example, a polymer that has good melt stability, or a polymeric composition including two or more polymers, wherein the composition exhibits melt stability and blend compatibility. Melt stability is defined as the resistance to any thermally induced chemical reactions and degradation during a heating process. Thermal stability of a melt is usually measured by monitoring (1) the change of the melt viscosity through a temperature ramp at a specified heating rate and oscillatory-shear frequency (e.g., radian/sec), and (2) the change of the melt viscosity through a time scan at a specified temperature and oscillatory-shear frequency. Blend compatibility is defined as the degree of optical clarity or transparency of a blend of multiple polymeric components. Blend compatibility is evaluated by dissolving the resin blend in toluene at specified blend ratio, and visually checking the opacity of the dissolved solution. Examples of suitable polymers include polyester, polycarbonate, polyolefins such as polyethylene, polypropylene, polybutene, and combinations thereof.

The polymeric composition including a cyclic-olefinic copolymer and at least one other polymer can be used to form an image-receiving layer of an image-receiving element for use in thermal printing systems, ink jet printing systems, electrographic printing systems, and electrophotographic systems. Thermal printing systems can include thermal transfer of dye or colorant by sublimation, diffusion, or mass transfer processes.

If needed, one or more polymerization catalyst can be used in the polymeric composition of the image-receiving layer to make the polymers, for example, polyesters, for the image-receiving layer. For example, a catalyst can be added in the amount of from 0.01% to 0.08% by weight solids to the polymeric composition to prevent or minimize transesterification.

A plasticizer can be present in the image-receiving layer in any effective amount. For example, the plasticizer can be present in an amount of from 5% to 100%, or from 4% to 30%, based on the weight of the total amount of polymer in the image-receiving layer. According to various embodiments, an aliphatic ester plasticizer can be used in the image-receiving layer. Suitable aliphatic ester plasticizers can include both monomeric esters and polymeric esters. Examples of aliphatic monomeric esters include ditridecyl phthalate, dicyclohexyl phthalate, and dioctylsebacate. Examples of aliphatic polyesters include polycaprolactone, poly(butylene adipate) and poly(hexamethylene sebacate). Various aliphatic ester plasticizer, including polyesters or monomeric esters, are disclosed in U.S. Pat. No. 6,291,396. Phthalate ester plasticizers are disclosed in U.S. Pat. No. 4,871,715.

The image-receiving layer can include a release agent such as a modified polydimethylsiloxane. Suitable release agents are known in the art, and can include, for example, those described in U.S. patent application Ser. No. 10/729,567 to Kung et al., of the formula:

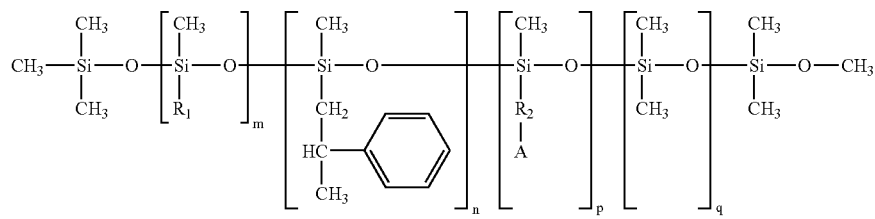

wherein $R_1$ is an alkyl chain of $C_9H_{19}$ or greater; $R_2$ is an alkyl chain of $C_3H_6$ or greater; A is NH—$R_3$, NHNH$_2$, NHCO—$R_3$, NH—$R_4$—NH$_2$, or NHCO—$R_4$—NH$_2$; $R_3$ is an alkyl chain of $C_2H_5$ or greater; $R_4$ is an alkyl chain of $C_2H_4$ or greater; m is from 0 to 95 weight percent; n is from 0 to 70 weight percent; p is from 0 to 40 weight percent; and q is from 0 to 95 weight percent, with the proviso that when m is 0, then n is 0, otherwise when m is greater than 0, n is from 0.1 to 70 weight percent, based on the total weight of the release agent. According to various embodiments, m can be from 20 to 80 weight percent, n can be from 1 to 80 weight percent, more preferably from 20 to 80 weight percent, and p can be from 20 to 40 weight percent when n and m are both 0, or any combination thereof. $R_1$, $R_2$, $R_3$ and $R_4$ can each independently be selected from straight or branched alkyl chains, except that when m and n are both 0, $R_3$ is an alkyl chain of $C_8H_{17}$ or greater. Suitable release agents can include, for example, GP-7101, GP-7105, GP-70-S, GP-74, and GP-154, all available from Genesee Polymers, Flint, Mich. Other suitable release agents can include, for example, those disclosed in U.S. Pat. Nos. 4,820,687 and 4,695,286, Silwet L-7230 and Silwet L-7001 from Crompton Corporation of Long Reach, W.Va., USA, and solid polydimethylsiloxanes such as but not limited to MB50-315 silicone, a 50:50 blend of bisphenol-A polycarbonate and ultrahigh MW polydimethyl siloxane, from Dow Corning of Midland, Mich., USA.

If present, the release agent can be present in the image-receiving layer in an amount of greater than or equal to $5.5 \times 10^{-4}$ g/m$^2$. For example, the release agent can be present in an amount of greater than or equal to 0.001 g/m$^2$, from $5.5 \times 10^{-4}$ g/m$^2$ to 0.045 g/m$^2$, from $5.5 \times 10^{-4}$ g/m$^2$ to 0.02 g/m$^2$, or from 0.001 g/m$^2$ to 0.01 g/m$^2$.

The release agent can be present in one or more layers of the image-receiving element. For example, the release agent can be present in the dye image-receiving layer, a support, an adhesive layer, a tie-layer, an antistatic layer, or any other layer of the image-receiving element. When the support is a composite or laminate structure, the release agent can be in one or more layers of the support, for example, a base layer, a tie-layer, an adhesive layer, or a backing layer. According to various embodiments, the release agent can be in a layer between the base layer of the support and the dye image-receiving layer.

The image-receiving layer can include alpha-tocopherol or a derivative thereof. An example of alpha-tocopherol is Vitamin E, available as Irganox® E201 from Ciba Specialty Chemicals, Inc., Tarrytown, N.Y. Alpha-tocopherol is known as 2,5,7,8,-tetramethyl-2-4(4',8',12'-trimethyltridecyl)-6-chromanol. Derivatives can include, for example, alpha-tocopherol acetates. Alpha-tocopherol can be present in an amount of at least 0.001 weight percent of the image-receiving layer, for example, from 0.005 to 10 weight percent, from 0.01 to 2.0 weight percent, from 0.01 to 0.4 weight percent, or from 0.05 to 0.2 weight percent.

The release agent and alpha-tocopherol or a derivative thereof can be present in the image-receiving layer in a ratio of from 100:1 to 1:1 by weight percent, for example, from 80:1 to 2:1, or from 16:1 to 4:1. The ratio will depend on the materials present in the image-receiving layer. If the amount of alpha-tocopherol is too low, streaking and lines can occur on the image-receiving layer. If the amount of alpha-tocopherol is too high, the Dmin of the receiver can become unacceptable for the desired application.

The image-receiving layer can be present in an amount that is effective for its intended purpose. For example, the image-receiving layer can be coated at a coverage of from 0.5 g/m$^2$ to 20 g/m$^2$, 1.0 g/m$^2$ to 15 g/m$^2$, or 3.0 g/m$^2$ to 10 g/m$^2$. The image-receiving layer can be present on one or both sides of a support.

The image-receiving layer can be formed on a support by any method known to practitioners in the art, including but not limited to printing, solution coating, dip coating, and extrusion coating. When the image-receiving layer is extruded, the process can include (a) forming a melt comprising the polymeric composition; (b) extruding or coextruding the melt as a single-layer film or a layer of a composite (multilayer or laminate) film; and (c) applying the extruded film to the support for the image-receiving element. In step (b), the melt can be extruded and cast as a film or laminate film at any desired thickness, for example, a thickness of at least 100 microns, for example, 100 to 800 microns, and then uniaxially or biaxially stretched to less than 10 microns, for example, 3-4 microns. The extruded uniaxially or biaxially stretched film can be applied to the support, for example, a moving web. Examples of suitable extruded dye—receiving layers include those disclosed in U.S. Pat. Nos. 5,387,571 and 5,302,574.

An image-receiving element can include a support beneath the image-receiving layer. The support for the image-receiving element can be a transparent film, for example, a poly (ether sulfone), a polyimide, a cellulose ester such as cellulose acetate, a poly(vinyl alcohol-co-acetal), or a poly (ethylene terephthalate). The support can be a reflective layer, for example, baryta-coated paper, white polyester (polyester with white pigment incorporated therein), an ivory paper, a condenser paper, or a synthetic paper, for example, DuPont Tyvek® by E.I. DuPont de Nemours and Company. The support can be employed at any desired thickness, for example, from 10 μm to 1000 μm. Other suitable supports as known to practitioners in the art can also be used, and can be chosen dependent on the image transfer system being used.

According to various embodiments, the support can be a composite or laminate structure comprising a base layer and one or more additional layers. The additional layers can include a tie-layer, an adhesive layer, an antistatic layer, a backing layer, a slip layer, or a combination thereof. The base layer can comprise more than one material, for example, a combination of one or more of a microvoided layer, a non-voided layer, a synthetic paper, a natural paper, and a polymer.

According to various embodiments, a tie-layer can be used for adhering the extruded image-receiving layer to the support. The tie-layer can be a conventional material capable of adhering the support and image-receiving layer together. The tie-layer can comprise a thermoplastic polymer having preselected antistatic properties, adhesive properties, or viscoelastic properties.

According to various embodiments, the tie-layer can have viscoelastic properties such that the viscosity is not more than 10 times or less than 1/10, or not more than 3 times or less than 1/3, that of the image-receiving layer.

According to various embodiments, the tie-layer can have antistatic properties. Suitable materials for use as the antistatic tie-layer include PELLESTAT 300 polymer, commercially available from Sanyo Chemical Industries, Ltd. (Tokyo) or Tomen America, Inc. (New York, N.Y.), PEBAX copolymer, commercially available from Atofina (Finland), polymers disclosed in EP-A-1,167,425, and other polymers as known to practitioners in the art.

Other materials known in the art that can be melt processed while retaining their antistatic activity and overall physical performance are various polymeric substances containing a high concentration of polyether blocks. Ionic conduction along the polyether chains can make these polymers inherently dissipative. Exemplary ionic conductors can include polyether-block-copolyamide (U.S. Pat. Nos. 4,115,475; 4,195,015; 4,331,786; 4,839,441; 4,864,014; 4,230,838; 4,332,920; and 5,840,807), polyetheresteramide (U.S. Pat. Nos. 5,604,284; 5,652,326; 5,886,098), and a thermoplastic polyurethane containing a polyalkylene glycol moiety (U.S. Pat. Nos. 5,159,053 and 5,863,466). Such inherently dissipative polymers (IDPs) have been shown to be thermally stable and readily processable in the melt state in their neat form, or in blends with other thermoplastic materials. Other known inherently conductive polymers (ICPs), for example, polyaniline, polypyrrole, and polythiophene, can be sufficiently thermally stable if a compatibilizer is added.

According to various embodiments, the antistatic tie-layer and the image-receiving layer can be coextruded. For example, a first melt and a second melt can be formed, wherein the first melt comprises a polymer for the image-receiving layer and the second melt comprises the thermoplastic antistatic polymer having desirable adhesive and viscoelastic properties. The coextruded layers, or composite film, can be stretched to reduce the thickness. The extruded and stretched film can be applied to a support of the image-receiving element at a temperature below the Tg of the dye image-receiving layer. According to various embodiments, this can be done by quenching the extruded film between two nip rollers.

According to various embodiments wherein the tie-layer and dye image-receiving layer are coextruded, a compatibilizer layer can be added to ensure compatability between the layers by controlling phase separation. Exemplary compatibilizers can include those described in U.S. Pat. No. 6,436,619, EP-A-0,342,066, and EP-A-0,218,665. Further examples of compatibilizers can include, but are not limited to: polyethylene, polypropylene, ethylene/propylene copolymers, ethylene/butene copolymers, grafts of the above with maleic anhydride or glycidyl methacrylate; ethylene/alkyl (meth)acrylate/maleic anhydride copolymers, the maleic anhydride being grafted or copolymerized; ethylene/vinyl acetate/maleic anhydride copolymers, the maleic anhydride being grafted or copolymerized; the two above copolymers in which anhydride is replaced fully or partly by glycidyl methacrylate; ethylene/(meth)acrylic acid copolymers and their salts; ethylene/alkyl (meth)acrylate/glycidyl methacrylate copolymers, the glycidyl methacrylate being grafted or copolymerized; and grafted copolymers constituted by at least one mono-amino oligomer of polyamide and of an alpha-monoolefin (co)polymer grafted with a monomer able to react with the amino functions of said oligomer. Other exemplary compatibilizers can include terpolymers of ethylene/methyl acrylate/glycidyl methacrylate and copolymers of ethylene/glycidyl methacrylate, commercially available as LOTADER from Atofina, or maleic anhydride grafted or copolymerized polyolefins such as polypropylene, or polyethylene, commercially available as OREVAC from Atofina.

The choice of printing system for use with the image-receiving element dictates the image-forming material. For ink jet printing, an ink comprising a water-soluble pigment or dye and a carrier can be used to form an image on the image-receiving element. For electrographic and electrophotographic printing, toners or developers as known in the art can be transferred directly or through an intermediate receiver to the image-receiving element. For thermal printing, a donor element for superposition with the image-receiving element is required. For laser thermal printing, the donor element can include dyes or pigments suitable for sublimation or mass transfer from the donor to the image-receiving element on image-wise heating of the donor element with a laser. For resistive head thermal printing, a donor element including a diffusible colorant, preferably a dye, is used.

The thermal resistive head dye-donor element suitable for use with the image-receiving element described herein can include a dye-donor layer having one or more colored areas (patches) containing dyes suitable for printing. As used herein, a "dye" can be one or more dye, pigment, colorant, or a combination thereof, and can optionally be in a binder or carrier as known to practitioners in the art. During thermal resistive head printing, at least a portion of one or more colored areas can be transferred to the image-receiving element, forming a colored image on the image-receiving element. The dye-donor layer can include a laminate area (patch) having no dye. The laminate area can follow one or more colored areas. During thermal printing, the entire laminate area can be transferred to the image-receiving element. The dye-donor layer can include one or more colored areas and one or more laminate areas. For example, the dye-donor layer can include three color patches, for example, yellow, magenta, and cyan, and a clear laminate patch, for forming a three color image with a protective laminate layer on an image-receiving element.

Any dye transferable by heat can be used in the dye-donor layer of the thermal resistive head dye-donor element. The dye can be selected by taking into consideration hue, lightfastness, and solubility of the dye in the dye donor layer binder and the dye image receiving layer binder. Dyes suitable for use in thermal resistive head donor elements are chosen in combination with a binder in the dye-donor layer of the donor element and in combination with the polymeric composition of the image-receiving layer of the image-receiving element, such that the receiver/donor dye partition coefficient between the dye in the dye-donor layer of the donor element and the dye in the image-receiving layer of the image-receiving element is 2.0 or greater. Each dye-donor layer patch can range from 20 wt. % to 90 wt. % dye, relative to the total dry weight of all components in the layer. The dye percent is ideally chosen in view of the specific donor and receiver combination.

The dye-donor layer can be formed or coated on a support. The dye-donor layer can be formed on the support by a printing technique such as but not limited to a gravure process, spin-coating, solvent-coating, extrusion coating, or other methods known to practitioners in the art. The support can be formed of any material capable of withstanding the heat of thermal printing. According to various embodiments, the support can be dimensionally stable during printing. The support can have a thickness of from 1 μm to 30 μm, for example, from 3 μm to 7 μm.

The dye-donor element can be a sheet of one or more colored patches or laminate, or a continuous roll or ribbon. The continuous roll or ribbon can include one patch of a monochromatic color or laminate, or can have alternating areas of different patches, for example, one or more dye patches of cyan, magenta, yellow, or black, one or more laminate patches, or a combination thereof.

The thermal dye-donor element and image-receiving element described herein, when placed in superimposed relationship such that the dye-donor layer of the dye-donor element is adjacent the dye image-receiving layer of the image-receiving element, can form a print assembly. An image can be formed by passing the print assembly past a print head, wherein the print head is located on the side of the dye-donor element opposite the image-receiving element. The print head can apply heat image-wise to the dye-donor element, causing the dyes in the dye-donor layer to transfer to the dye image-receiving layer of the image-receiving element. Thermal print heads that can be used with the print assembly are available commercially and known to practitioners in the art. Exemplary thermal print heads can include, but are not limited to, a Fujitsu Thermal Head (FTP-040 MCSOO1), a TDK Thermal Head F415 HH7-1089, a Rohm Thermal Head KE 2008-F3, a Shinko head (TH300U162P-001), and Toshiba heads (TPH162R1 and TPH207R1A).

When multiple color images are to be obtained, the print assembly is formed as many times as there are colors to be printed during the time when heat is applied by the thermal print head. After the first dye is transferred from a first dye-donor element, the dye-donor element and image-receiving element can be peeled apart. A second dye-donor element (or another area of the dye-donor element with a different dye) can be brought into register with the image-receiving element and the process can be repeated until all colors are printed. A laminate patch can also be printed on the image in this manner to protect the image.

An improved image-receiving element can include a polymeric composition having a cyclic-olefinic copolymer and another polymer, wherein the polymeric composition has increased melt stability and good melt compatibility at high temperatures over an extended period of time, and does not require use of a stabilizer.

The following examples are provided to further illustrate the invention.

EXAMPLES

Example 1

The compositions of the experimental samples E1-E1 2 and comparative samples C1-C19 are shown in Table 1. The polymers are designated P1-P9, and cyclic-olefinic copolymers are designated COC-1 through COC-4. Polymers P1 through P5 are polyesters. P1 is a polyester copolymer of 1,4-cyclohexanedicarboxylic acid (100 mole %), 1,4-cyclohexanedimethanol (50 mole %), 4,4'-bis(2-hydroxyethyl) bisphenol-A (48 mole %), and 2-ethyl-2-(hydroxymethyl)-1,3-propanediol (2 mole %). P2 is a polyester copolymer of trans-cyclohexane-1,4-dicarboxylic acid (100 mole %), ethylene glycol (50 mole %), and 4,4'-bis(2-hydroxyethyl) bisphenol-A (50 mole %). P3, P4 and P5 are polyesters commercially available under the tradename Vylon® 200, 290 and 600, respectively, all obtained from Toyobo Ltd. (Japan). P6 and P7 are polycarbonates. P6 is bisphenol A polycarbonate, commercially available as Lexan® 151 from General Electric (USA). P7 is Lexan® EXRL0049-NA8A005T from GE, a copolymer of bisphenol A polycarbonate and polydimethyl siloxane. P8 and P9 are polyolefins. P8 is Petrothene® NA 214-000 low density polyethylene from Equistar Chemical Company (USA), and P9 is Pro-fax® PDC-1292 polypropylene from Basell Polyolefins. COC-1 through COC-4 are cyclic-olefinic copolymers of Topas® COC 6013, 5013, 8007, and Topas™, respectively, from Ticona Ltd. (USA). DOS is dioctyl sebacate.

For each experimental and comparative sample, the components were weighed out in the amount by weight % shown in Table 1, and then put in a vacuum oven at 40° C. overnight to remove moisture. An ATR Plasti-corder torque rheometer from C.W. Brabender Instruments, Inc. (USA) was used to compound each sample using a mixing bowl with a removable blade running at 60 rpm at a temperature of 230° C. for 2 minutes with nitrogen gas purge. The compounded sample was removed from the ATR Plasti-corder and dried at 40° C. under vacuum for 24 hours prior to rheological analysis. After drying, each sample was analyzed in a Rheometrics Mechanical Spectrometer (RMS-800) from TA Instruments (USA) for crosslinking or thermal degradation reactions in a temperature range of 200-300° C., at 10° C./min at a frequency of 1 radian/sec in a dry air atmosphere. The results are shown in Table 1.

In a temperature ramp experiment in the RMS-800 for melt stability, the viscosity of a sample usually decreases monotonically as the temperature of the sample melt increases, unless a chemical reaction and/or thermal degradation occurs in the specified temperature range. If a chemical reaction such as cross-linking or thermal degradation occurs, it is manifested in the sample by a sudden viscosity increase or decrease, respectively, at higher temperatures. Therefore, melt stability was rated based on viscosity measurement over time, wherein "CLR" indicates a cross-linking reaction occurred, "TD" indicates thermal degradation occurred, and "good" indicates a stable melt Blend compatibility was rated based on solution haziness of the blend, where "good" was compatible at the blend ratio(s) tested, "acceptable" was some slight opacity at the blend ratio, and "no" was opaque at the given blend ratio.

C19 required the addition of 0.02 weight % phosphorus acid as a stabilizer to eliminate or significantly reduce the cross-linking reaction or network formation. In contrast, the inventive blends of E1-E13 required no addition of stabilizer to obtain thermally stable melts.

TABLE 1

| ID# | Polyester | | | | | Poly-carbonate | | Polyolefin | | Cyclic-olefinic Copolymer | | | | DOS | Melt Stability | Blend Compatibility |
| | P1 | P2 | P3 | P4 | P5 | P6 | P7 | P8 | P9 | COC-1 | COC-2 | COC-3 | COC-4 | | | |
| --- | --- | --- | --- | --- | --- | --- | --- | --- | --- | --- | --- | --- | --- | --- | --- | --- |
| C1 | 74.66 | | | | | 20.01 | | | | | | | | 5.33 | CLR | good |
| C2 | | 74.66 | | | | 20.01 | | | | | | | | 5.33 | CLR | good |
| C3 | | | 74.66 | | | 20.01 | | | | | | | | 5.33 | CLR | good |
| C4 | | | | 74.66 | | 20.01 | | | | | | | | 5.33 | CLR | good |
| C5 | | | | | 74.66 | 20.01 | | | | | | | | 5.33 | CLR | good |
| C6 | 74.66 | | | | | | 20.01 | | | | | | | 5.33 | CLR | good |
| C7 | 74.66 | | | | | | | 20.01 | | | | | | 5.33 | good | no |
| C8 | 74.66 | | | | | | | | 20.01 | | | | | 5.33 | good | no |
| C9 | 100.00 | | | | | | | | | | | | | 0 | good | na |
| C10 | 94.67 | | | | | | | | | | | | | 5.33 | good | good |
| C11 | | | | | | 100.00 | | | | | | | | 0 | good | na |
| C12 | | | | | | 94.67 | | | | | | | | 5.33 | good | good |
| C13 | | | | | | | | | | | | 100 | | 0 | CLR | na |
| C14 | | | | | | | | | | | | 94.67 | | 5.33 | CLR | good |
| C15 | | | | | | | | | | 100 | | | | 0 | CLR | na |
| C16 | | | | | | | | | | | 100 | | | 0 | CLR | na |
| C17 | | | | | | | | | | | | 100 | | 0 | CLR | na |
| C18 | 44.67 | | | | | | | | | | | | 50 | 5.33 | CLR | no |
| C19[1] | 74.66 | | | | | 20.01 | | | | | | | | 5.33 | good | good |
| E1 | 74.66 | | | | | | | | | 20.01 | | | | 5.33 | good | acceptable |
| E2 | 74.66 | | | | | | | | | | 20.01 | | | 5.33 | good | acceptable |
| E3 | 74.66 | | | | | | | | | | | 20.01 | | 5.33 | good | acceptable |
| E4 | 74.66 | | | | | | | | | | | | 20.01 | 5.33 | good | acceptable |
| E5 | | 74.66 | | | | | | | | | | | 20.01 | 5.33 | good | acceptable |
| E6 | | | 74.66 | | | | | | | | | | 20.01 | 5.33 | good | acceptable |
| E7 | | | | 74.66 | | | | | | | | | 20.01 | 5.33 | good | acceptable |
| E8 | | | | | 74.66 | | | | | | | | 20.01 | 5.33 | good | acceptable |
| E9 | | | | | | 74.66 | | | | | | | 20.01 | 5.33 | good | acceptable |
| E10 | 84.67 | | | | | | | | | | | | 10.00 | 5.33 | good | good |
| E11 | 84.67 | | | | | | | | | | | | 10.00 | 5.33 | good | good |
| E12 | 92.17 | | | | | | | | | | | | 5.00 | 5.33 | good | good |
| E13 | 89.67 | | | | | | | | | | | | 2.50 | 5.33 | good | good |

[1]Additional 0.02 wt. % of phosphorous acid added.

Samples C1-C6 demonstrate that blends of polyesters and polycarbonates are compatible but not thermally stable and cross-linking or other chemical reactions may take place in the temperature range of 260-300° C. as indicated in Table 1. As shown in samples E1 through E9, as indicated in Table 1, the inventive blends of polyesters and cyclic-olefinic copolymers are thermally stable in the same specified temperature range and have good or acceptable compatibility ratings.

Samples C7 and C8 are blends of polyester P1 and polyolefin P8 or P9, respectively. The blends are as thermally stable as those of E1-E13, however, the polymers in each blend are incompatible. Incompatible blends are known to result in lower optical density and variable image density in printing due to nonuniform dye transfer efficiency when the blend is used as an image-receiving layer, such as in thermal dye transfer printing.

Even though blends of polyesters and polycarbonates were not thermally stable, polyester and polycarbonate alone (see C9-C12) are thermally stable throughout the temperature range of 200-300° C. As shown in C13-C17, cyclic-olefinic copolymers by themselves are not thermally stable. However, as shown in the examples E1-E13, blends of polyester and cyclic-olefinic copolymers are thermally stable.

The amount of cyclic-olefinic copolymer in the blend with polyester can be up to but not more than 50 wt %, as demonstrated in examples C18, E4, and E11-E13.

In summary, the invention blends comprising polyester and cyclic-olefinic copolymers meet both the requirements of being thermally stable and chemically compatible, which qualifies the blend for applications such as an extrudable or co-extrudable image-receiving layer for use in a print receiver for example, in thermal dye transfer printing, ink jet printing, electrography, or electrophotography.

Example 2

In Table 2, three imaging-receiving layer compositions (C20, C21, and E14) are set forth to illustrate the advantage of using a cyclic-olefinic copolymer such as Topas COC 6013 of Ticona Ltd., as compared to using a polycarbonate such as Lexan 151 of General Electric, to blend with polyester. Other components of the imaging layer compositions are as follows: GP-70-S, a methylalkylaryl silicone from Genesee Polymers Corp.(USA); Irganox E 201, a 3,4-dihydro-2,5,7,8-tetramethyl-2-(4,8,12-trimethyltridecyl)-2H-1 -benzopyran-6-ol from Ciba Specialty Chemicals Inc.; dioctyl sebacate (DOS); phosphorous acid ($H_3PO_3$); and Duraphos AP-240L dioleyl phosphite (DOP) from Rhodia Inc. (USA).

TABLE 2

| ID# | Polyester P1 | Polycarbonate P6 | Polycarbonate P7 | Cyclic-olefinic Copolymer COC-1 | Release Agent GP-70S | Anti-oxidant Irganox E201 | Plasticizer DOS | Stabilizers H₃PO₃ | Stabilizers DOP | Melt Stability |
|---|---|---|---|---|---|---|---|---|---|---|
| C20 | 73.85 | 19.80 | | 0.00 | 0.8 | 0.1 | 5.33 | 0.02 | 0.1 | increased viscosity |
| C21 | 73.85 | | 19.80 | | 0.8 | 0.1 | 5.33 | 0.02 | 0.1 | increased viscosity |
| E14 | 73.95 | 0.00 | | 19.82 | 0.8 | 0.1 | 5.33 | 0 | 0 | unchanged viscosity |

Figure 2:
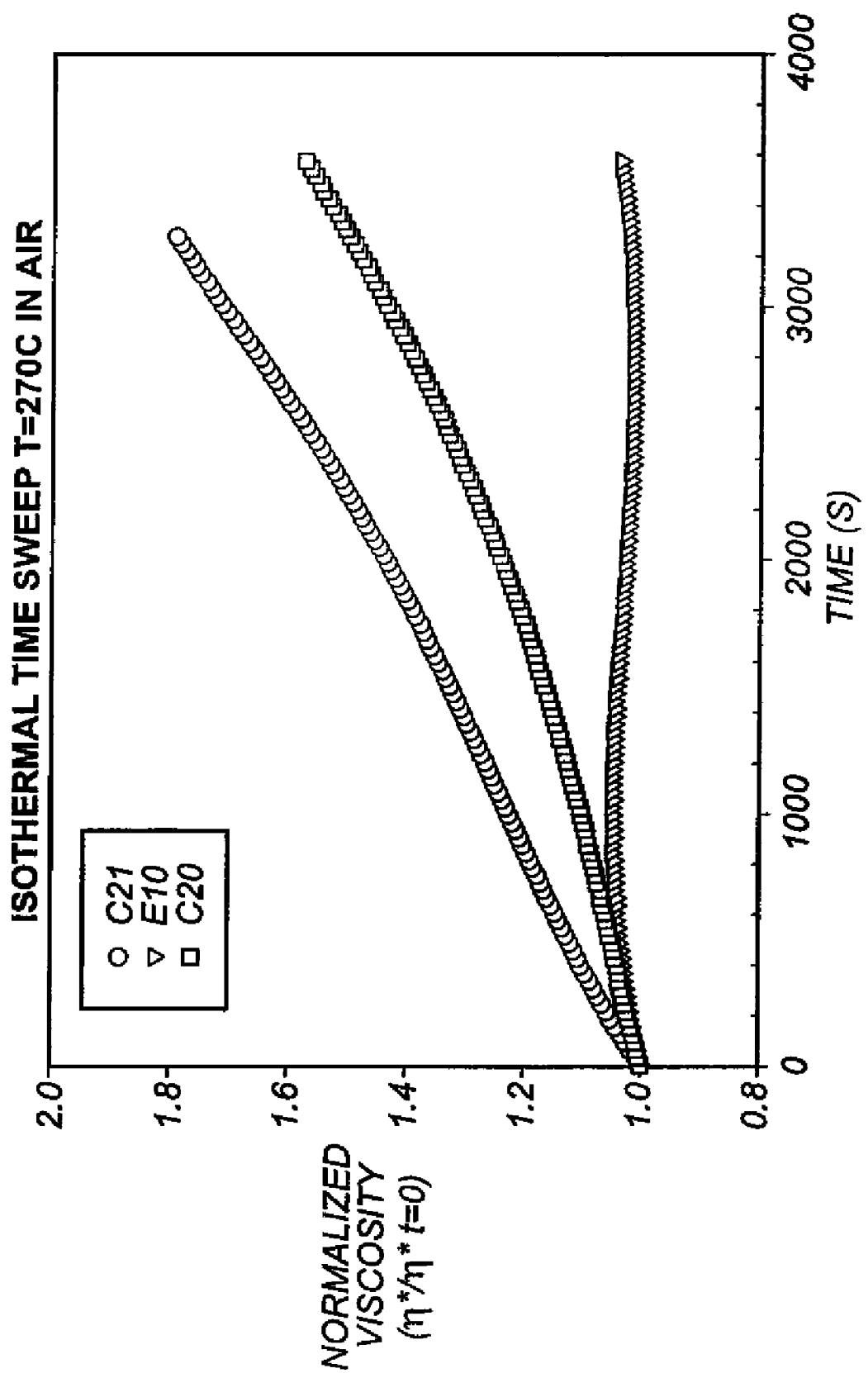
FIG. 2 depicts the viscosity of certain polymeric compositions when held at a temperature of 270° C. in air for a period of 60 minutes.

During an RMS-800 melt stability temperature scan experiment as described in Example 1, none of C20, C21, or E10 showed an obvious cross-linking reaction or thermal degradation, as shown graphically in FIG. 1. However, E14 showed much more thermal stability than C20 or C21 when the samples underwent an RMS-800 time sweep at 270° C. in air for a period of 60 minutes as shown in FIG. 2, where normalized viscosity is plotted over time. As seen in FIG. 2, E14 demonstrated a superior thermal stability at elevated temperatures for extended times, demonstrating that inventive blends can provide sufficient robustness to make extrusion-coated imaging layers continuously in an extrusion production environment at high temperatures and speeds.

The invention claimed is:

1. An image receiving element comprising a substrate and an image-receiving layer, wherein the image-receiving layer is an extrudable polymeric composition comprising a transparent blend of a cyclic-olefinic copolymer, in an amount of between 5 wt. % to 20 wt. %, and at least one other polymer, wherein the at least one other polymer is a polyester or polycarbonate.

2. The image-receiving element of claim 1, wherein the composition is stable at a temperature of at least 270° C. for a period of at least 30 minutes.

3. The image-receiving element of claim 1, wherein the element is a thermal receiver, ink jet receiver, electrographic receiver, or electrophotographic receiver.

4. A thermal print assembly comprising an image-receiving element of claim 1 and a dye-donor element.

5. A method of thermal printing comprising:

obtaining a dye donor element comprising a dye-donor layer;

obtaining a thermal image-receiving element comprising a substrate and an image-receiving layer on the substrate, wherein the image-receiving layer comprises a polymeric composition, and the polymeric composition comprises a cyclic-olefinic copolymer, in an amount of between 5 wt. % to 20 wt. %, and at least one other polymer, wherein the at least one other polymer is a polyester or polycarbonate superposing the image-receiving layer with the dye-donor layer; and imagewise transferring a dye from the dye-donor layer to the image-receiving layer.

* * * * *